219-121

5/26/87 OR 4,668,853 SR

United States Patent [19]

Fey et al.

[11] Patent Number: 4,668,853

[45] Date of Patent: May 26, 1987

[54] ARC-HEATED PLASMA LANCE

[75] Inventors: Maurice G. Fey, Plum Boro; Charles B. Wolf, Irwin; Stefan L. G. Thunberg, Export, all of Pa.

[73] Assignee: Westinghouse Electric Corp., Pittsburgh, Pa.

[21] Appl. No.: 793,370

[22] Filed: Oct. 31, 1985

[51] Int. Cl.⁴ .......................... B23K 9/00; B23K 9/04

[52] U.S. Cl. ...................... 219/121 PN; 219/121 PR; 219/75; 219/121 PM

[58] Field of Search ................ 219/121 PN, 121 PM, 219/121 P, 76.16, 74, 75, 121 PR, 121 PP; 313/231.31, 231.41, 231.51

[56] References Cited

U.S. PATENT DOCUMENTS

| | | | |
|---|---|---|---|
| 3,705,975 | 12/1972 | Wolf et al. | 315/111.21 |
| 3,953,705 | 4/1976 | Painter | 219/121 PR |
| 3,997,333 | 12/1976 | Fey | 75/11 |
| 4,071,588 | 1/1978 | Fey et al. | 264/15 |
| 4,089,628 | 5/1978 | Blackburn | 431/6 |
| 4,140,892 | 2/1979 | Muller | 219/121 P |
| 4,144,444 | 3/1979 | Deneutieu et al. | 219/121 PP |
| 4,214,736 | 7/1980 | Wolf et al. | 13/9 R |
| 4,549,065 | 10/1985 | Camacho et al. | 219/121 PR |
| 4,570,048 | 2/1986 | Poole | 219/121 PR |

*Primary Examiner*—M. H. Paschall
*Attorney, Agent, or Firm*—L. P. Johns

[57] ABSTRACT

An arc-heated plasma lance characterized by an elongated tubular housing containing arc heater ports for producing a plasmic jet at one end of the housing and service ports for providing electric power, gas, and coolant fluid to the arc heater ports, and the service means extending into the housing from the other end.

13 Claims, 10 Drawing Figures

ARC-HEATED PLASMA LANCE

CROSS-REFERENCE TO RELATED APPLICATION

This application is related to co-pending Application Ser. No. 692,810, filed Jan. 18, 1985, entitled "APPARATUS AND PROCESS FOR REDUCTION OF METAL OXIDES", the invention of Maurice G. Fey, assigned to the assignee of this application.

BACKGROUND OF THE INVENTION

1. Field of the Invention

This invention pertains to a portable arc heater and more particularly it relates to a arc heated plasma lance.

2. Description of the Prior Art

A majority of coal-fired boilers employed by public utilities today use pulverized coal having heating values ranging from 7,000 to 14,000 BTU/lb, and often a high moisture content. In order to ignite the coal an external energy source is required which customarily has been satisfied by the use of spark-ignited oil or natural gas-fired lighters. Once boiler warning has been effected and the coal combustion has stabilized, the start-up lighters can be taken out of service as the coal combustion increases and the boiler reaches nominal power. Inasmuch as coal is graded according to volatility, moisture content and heating value, it is more or less difficult to ignite. In addition to this function, igniters may provide supplemental energy necessary to sustain and stabilize combustion under low stability conditions, such as cold or warm start-up, low load operation, and other transient operating conditions.

Auxiliary fuels, such as oil and gas, used for ignition have become increasingly expensive in the past decade. At the same time, auxiliary fuel consumption has increased because of the trend to cycling operation, the increased use of low rank or less stable coals, and the move toward lower turbulence/low $NO_x$ burners. For these reasons utilities are motivated to reduce their dependency on and consumption of auxiliary fuels. Accordingly, coal fired boilers operating on low grade coal are difficult and very expensive to start up with gas and oil. It is furthermore difficult to maintain combustion of the pulverized coal during turn-down cycles and therefore igniter systems are being utilized to minimize incomplete combustion or complete blackouts with the inherent risks of explosions.

SUMMARY OF THE INVENTION

An arc heated plasma lance is provided which comprises an elongated tubular housing; means including arc heating surfaces defining an arc chamber within the housing and including a pair of axially spaced, substantially cylindrical electrodes forming a narrow gap therebetween and adapted to be connected to a source of electrical potential to produce an arc in the gap; the electrodes being disposed adjacent to one end of the housing and the arc chamber extending in opposite directions from the gap and having a downstream outlet port facing the one end of the housing; means spacing and electrically insulating the electrodes from each other and comprising means for channeling gas to be heated at a high velocity through the gap and into the chamber; each electrode having magnetic coil means for producing a magnetic field at the arcing surfaces of the electrodes to rotate the arc; the arc heater being productive of an arc heated plasma gas ejected from the outlet port; walls forming coolant means and conduits for circulating a coolant fluid to and from the electrodes and magnetic coil means; supply means for supplying power, gas, and a coolant fluid to the corresponding electrodes, gap, coolant means, and conduits; the supply means having terminal connectors disposed at the end of the housing opposite the outlet port; the elongated tubular housing being comprised of a body portion and a detachable portion and the detachable portion enclosing the electrodes and the magnetic coil means; the supply means including interfitting portions adapted for disassembly and reassembly when the body and detachable portions of the tubular housing are disassembled and reassembled; a concentric sleeve extending substantially coextensively with the housing and forming with the housing a coolant-carrying clearance space adjacent to the housing; the supply means for the gas comprising telescopically interfitting conduits, the supply means for the coolant fluid comprising telescopically interfitting conduits, the interfitting conduits being in longitudinal zones substantially near the junction of the body and detachable portions of the housing; the supply means for the coolant fluid comprising an inlet connection external of the housing; the supply means for the gas comprising an inlet connection external of the housing; and the gas being selected from the group consisting of an oxidizing gas, air, and mixtures thereof.

The arc heated plasma lance of this invention includes a novel rod-shaped plasma torch with water, power, and gas connections at one end especially suited for furnace applications requiring a source of high temperature gas to be inserted through a furnace wall to a particular point. The invention also includes the advantage of utilizing a number of plasma torches or lances to replace the conventionally used gas or oil burners to improve start-up performance and turn-down (low power) performance of the boiler operation. The lance is used for superheating air (any oxidizing gas) to a temperature ranging from 3,000° F. to 12,000° F. in a plasma jet before mixing it with the coal powder to be burned and gives a significant improvement in combustion and boiler control over conventional combustion processes currently used.

DESCRIPTION OF THE PREFERRED EMBODIMENT

Figure 1A:
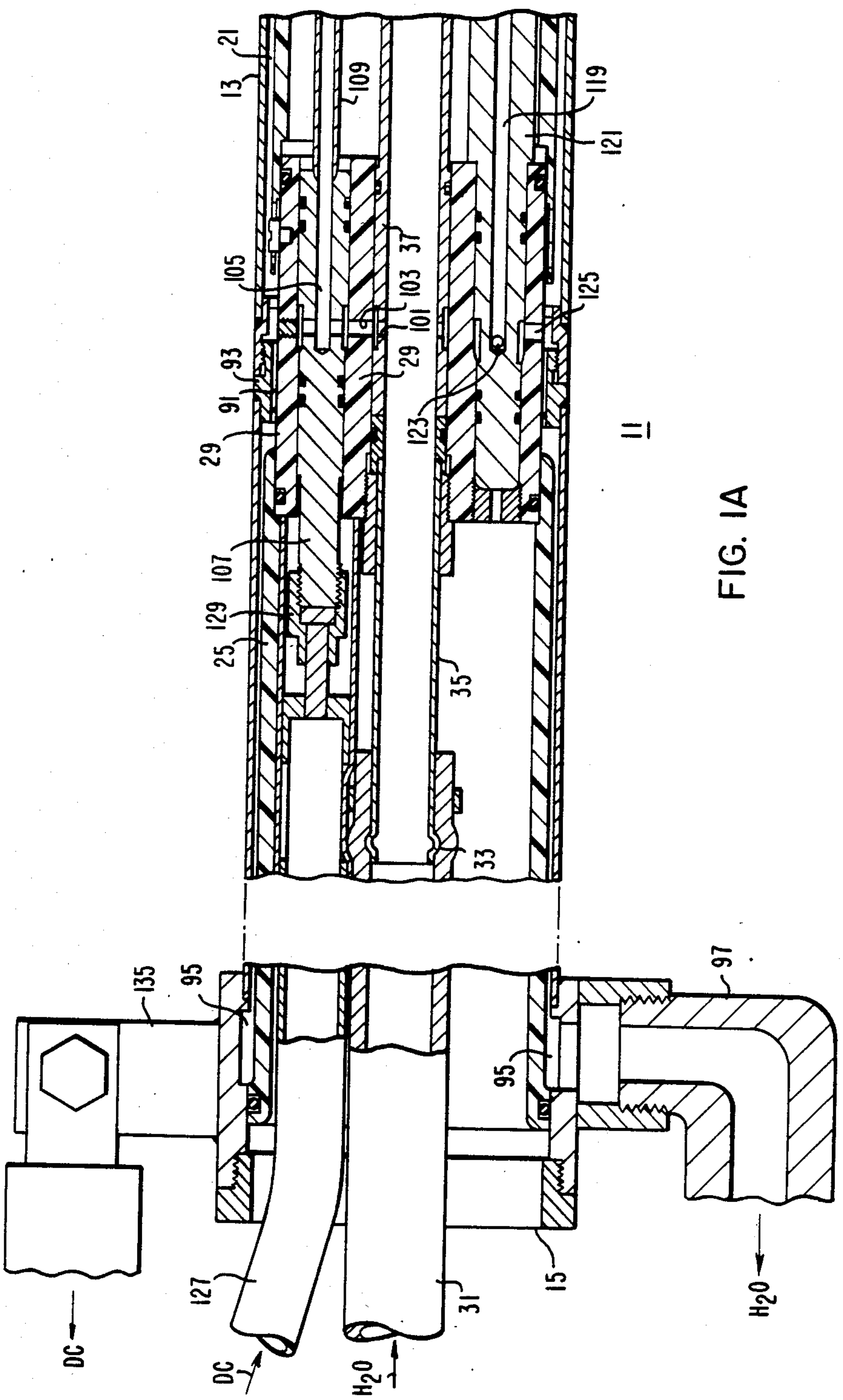
FIG. 1A is a sectional view of the left portion of an elongated arc heater plasma lance.

In FIG. 1 an arc heater lance is generally indicated at 11 and is comprised of a tubular housing 13 having a left inlet end 15 and a right outlet end 17. An arc heater unit generally indicated at 19 is disposed within the outlet end of the housing 13 and supply means for providing electric power, a coolant, and an arc heater gas are provided in the remaining portion of the housing. Within the housing a liner is disposed substantially coaxially within the housing and provides a clearance space 21 adjacent to the housing. The liner is comprised of two portions including a liner 23 and a liner 25 which are comprised of electrically insulating materials such as a fiberglass filled epoxy resin. The liner 23 extends between an end manifold 27 and a header 29. The liner 25 extends between the header 29 and the inlet end 15 of the lance 11. With the exception of the header 29 the liners 23, 25 enclose the operating parts of the lance including the arc heater unit 19 and the supply means.

Figure 2:
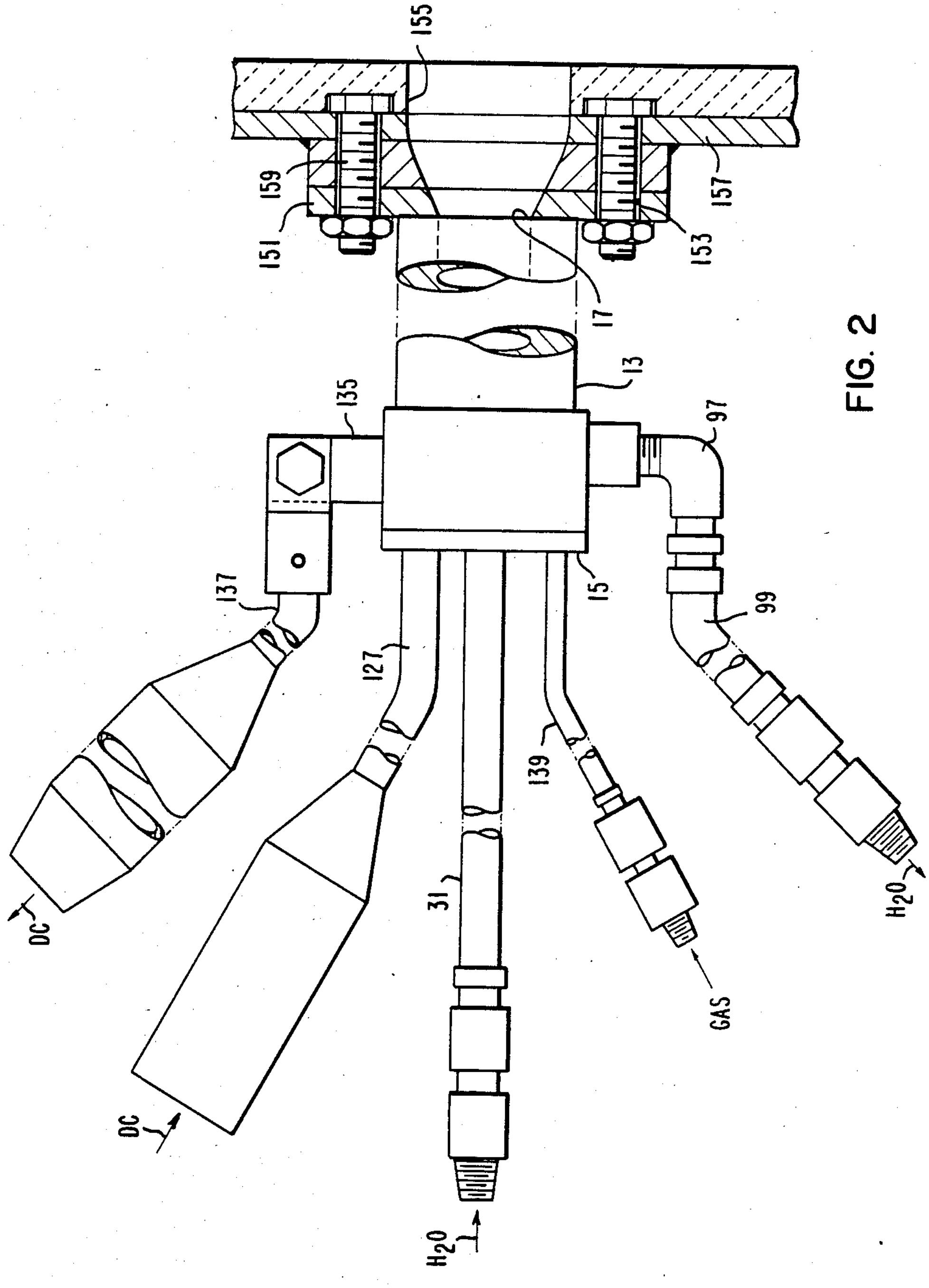
FIG. 2 is an elevational view of the lance of FIG. 1 showing supply ports at the left-hand end and showing one manner in which the outlet end of the arc heater lance may be attached to the port of a furnace wall.

As shown in FIGS. 1A and 2 the delivery of and connections for the supply elements including a coolant, such as water, electric power, and a gas, such as air, are provided only at the inlet end 15 of the lance 11. A coolant is delivered to the lance 11 through a flexible hose 31 which is connected at 33 to a tubular connector 35. The connector 35 is interconnected with a power tube 37, an end portion of which is seated within a core of the header 29. The opposite end of the power tube 37 is connected by a brazed joint 39 to a coupling 41 which in turn is secured to an adapter 43 in a fluid-tight manner by an O-ring 45. A tubular connector 47 is secured to the adapter 43 at a threaded joint 49 and includes spring loaded finger contacts 51 for assuring positive electrical contact as well as retaining the connector centrally within the coupling to provide a peripheral space 53 for the passage of coolant for cooling the connected parts 43 and 47. The adapter 43 is in turn connected in a fluid-tight manner, such as by a brazed joint 55, to a manifold 57 which has a plurality of peripherally spaced passages 59 for carrying coolant water to the arc heater unit 19.

The arc heater unit 19 comprises upstream and downstream tubular electrodes 61, 63 which are separated by an arc gap 65. The arc heater unit 19 also includes upstream and downstream coils 67, 69 as well as upstream and downstream liners 71, 73 which are tubular in structure and disposed between the respective coils 67, 69 and corresponding tubular electrodes 61, 63. Each liner 71, 73 provides a peripheral clearance space 75, 77 adjacent to the corresponding electrodes 61, 63 for the passage of the coolant. The upstream and downstream liners 71, 73 are composed of a dielectric material, such as a fiberglass filled epoxy resin.

Around the gap 65 is provided a manifold 79 having peripherally spaced holes 81 (FIG. 8) and an inner annular manifold groove 83. The groove 83 in turn is provided for delivering gas to the arc gap 65 which gas is delivered to the groove through tangentially extending passages 85 from an outer zone to be described hereinbelow.

The coolant moves from the clearance space 77 in the downstream electrode portion into a plurality of peripherally spaced radially extending holes 87 in a manifold, or end cap 89, of the lance 11. From the manifold the coolant enters the clearance space 21 peripherally disposed between the housing 13 and the liner 23. It is noted that a peripheral space 91 is disposed between the header 29 and a joint 93 by which upper and lower portions of the housing 13 are interconnected for assembly purposes. Accordingly, the coolant extends to a circular plenum chamber 95 from where the coolant leaves the lance 11 through an outlet 97 leading to a hose 99.

Figure 3:
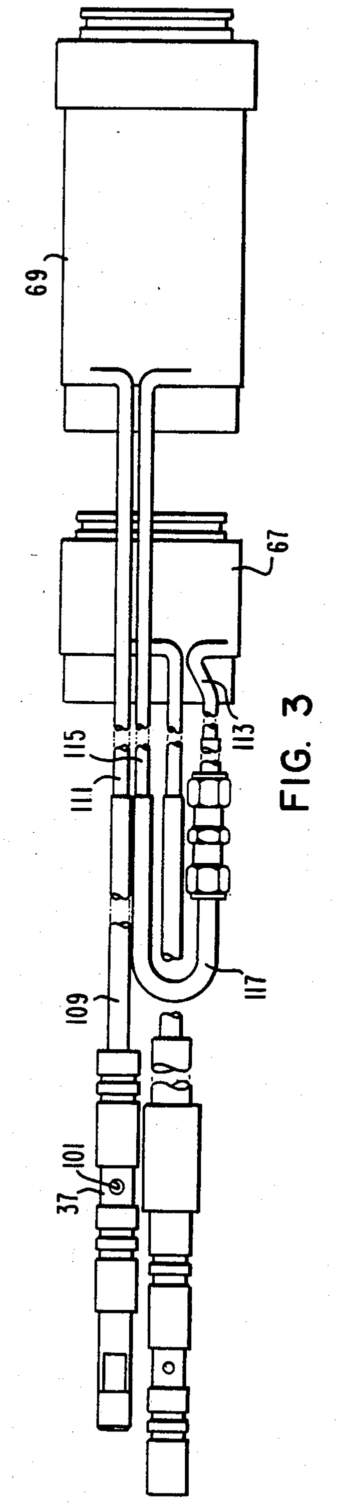
FIG. 3 is an elevational view partially in section of coil assemblies and conductors for current and a coolant.
Figure 5:
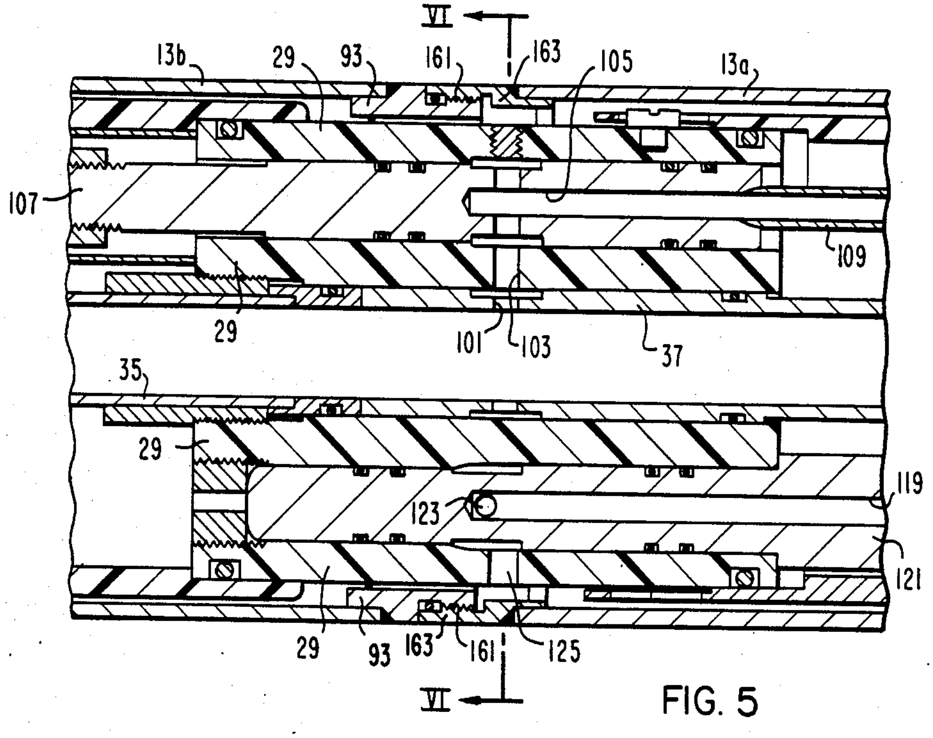
FIG. 5 is an enlarged sectional view of the header.

In addition to the foregoing means for cooling the electrodes 61, 63 as well as surrounding portions thereof, the cooling system is used for cooling the coils 67, 69. For that purpose a hole 101 (FIGS. 1A, 5, 6) which hole communicates with an aperture 103 extending through the header 29 to a bore 105 in a conductor 107. A tubular conductor 109 is connected to the bore 105 and extends through an interim conductor 111 (FIGS. 1B, 3) which extends to the downstream coil 69. After circulating through the downstream coil the coolant exits therefrom through a conductor 113 which extends to the upstream coil 67 through which the coolant circulates and exits therefrom through a conductor 115. The conductor 115 in turn is connected to a tubular conductor 117, communicates with a bore 119 (FIGS. 1A, 1B, 3) in a conductor 121. An aperture 123 extends from the bore 119 and throgh the header 29 where it communicates through a hole 125 in the header leading to the clearance space between the header and the housing 13 through which it flows to the plenum chamber 95, outlet 97, and hose 99.

Electric power for the electrodes 61, 63 as well as the coils 67, 69 is provided at a power level of up to three megawatts. The coils and the electrodes are connected in series to eliminate the need for a separate power supply and the circuit extends between the high voltage coils 69, 71 and the low voltage downstream electrode 63. Direct current power enters the lance 11 through a flexible cable 127 through the inlet end 15 of the lance (FIGS. 1A, 2). The cable is connected by a cable assembly 129 to the conductor 107 (FIG. 5) from where the power flows through conductors 109, 111 (FIG. 3) to the downstream coil 69. From there the power returns through the conductor 113 to the upstream coil 67 and then through the conductors 115, 117.

Figure 1B:
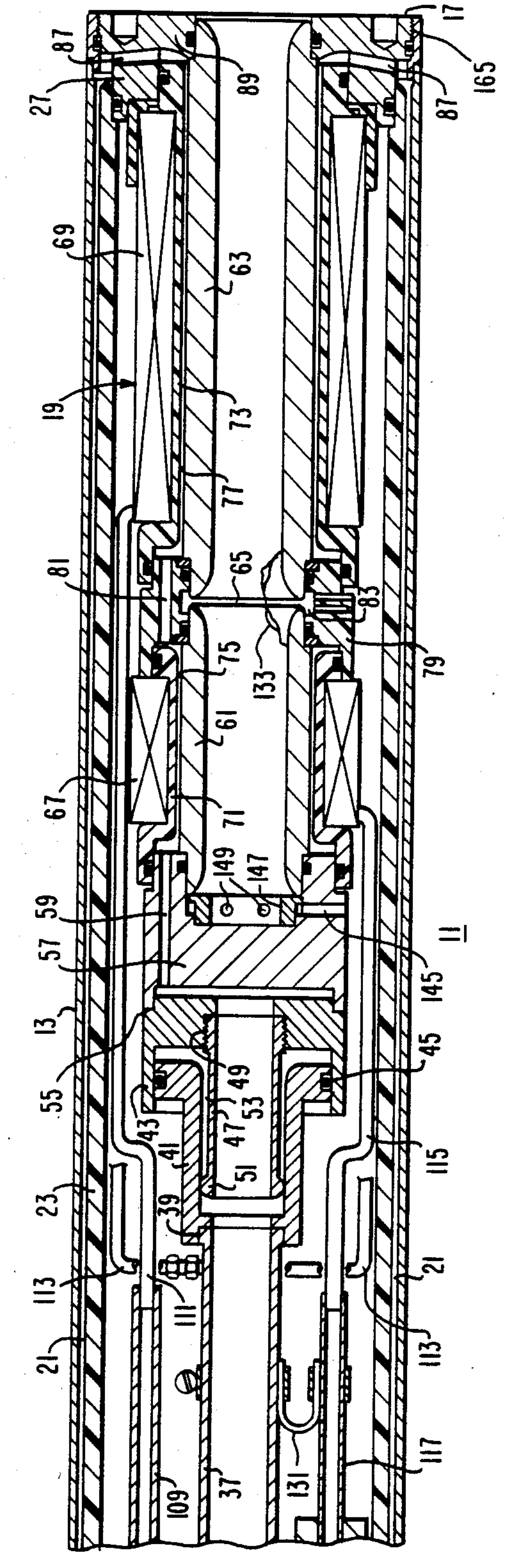
FIG. 1B is a sectional view of the right portion of the arc heater plasma lance of FIG. 1A.

As shown in FIG. 1B a shunt or pigtail conductor 131 extends between the conductor 117 and the power tube 37 through which the DC current is conducted to the coupling 41, the connector 47, the adapter 43, and the manifold 57 to the upstream electrode 61. From the upstream electrode 61 the current passes through an initial arc 133 over the gap 65 to the downstream electrode 63. At the outlet end 17 of the lance 11 the current is conducted from the electrode 63 through the end cap 89 to the tubular housing 13 by which it is conducted to a terminal 135 which is connected to a cable 137 (FIG. 2). The interaction of the current passing through the arc 133 and of the magnetic field induced in the arc chamber within the electrodes causes the arc 133 to rotate about the inner surfaces of the electrodes 61 and 63 so that damage to the electrode surfaces is minimized which otherwise occurs due to erosive effect of the termini of the arc upon electrode surfaces.

Figure 4:
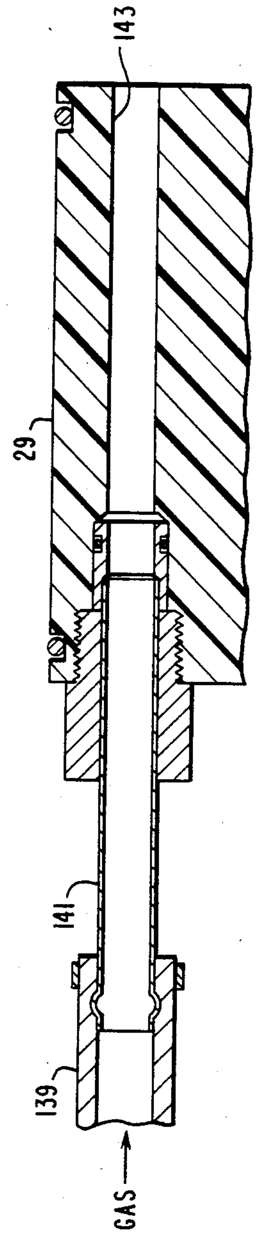
FIG. 4 is a fragmentary sectional view of the air connection to the header.
Figure 6:
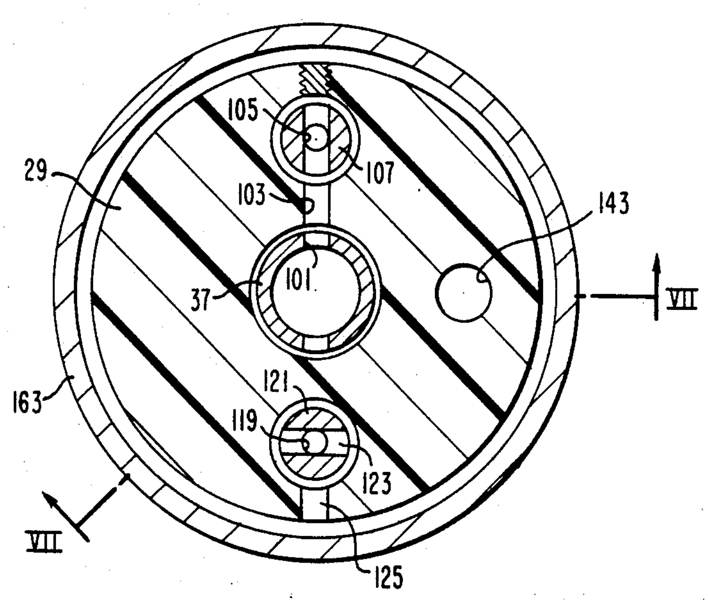
FIG. 6 is a vertical sectional view taken on the line VI—VI of FIG. 5.
Figure 7:
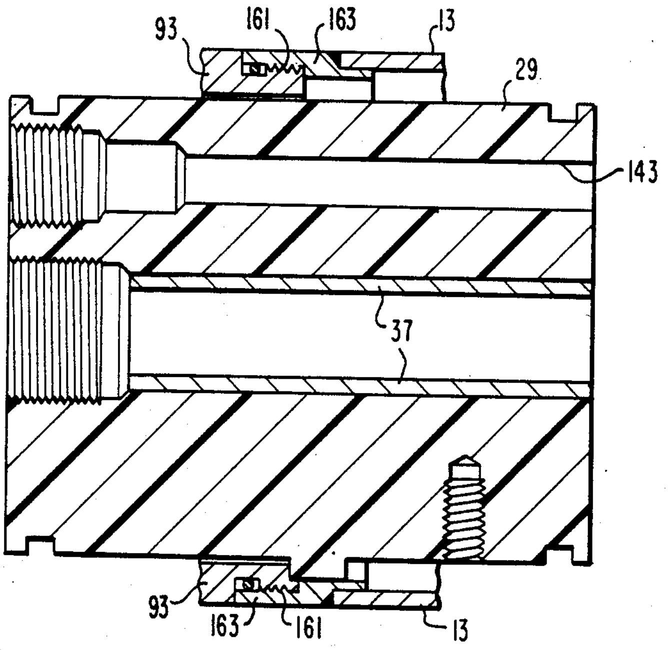
FIG. 7 is a sectional view taken on the line VII—VII of FIG. 6.

Gas is introduced into the lance for injection into the arc chamber through the gap 65 through a conduit system including a flexible hose 139 (FIG. 2) which is connected to a connecting tube 141 (FIG. 4) which communicates with a passage 143 in the header 29 (FIG. 6). As shown in FIG. 6, the hose 139, connecting tube 141, and passage 143 are disposed in a plane substantially 90° to that of the coolant hose 31 and the DC cable 127.

When the gas exits from the passage 143 (FIG. 4), it occupies all of the unoccupied portions of a chamber within the liner 23. A small portion of the gas enters the arc heater chamber through a passage 145 in the manifold 57, where it communicates with a plenum chamber around a swirl ring 147 having a plurality of spaced openings 149 for introducing the gas at the upstream end of the upstream electrode 61. The purpose of introducing a portion of gas at the upstream cavity of the arc heater chamber is to provide convection cooling in the upstream electrode region to prevent undesired arc attachment onto the manifold 57 at the area of the swirl ring 147.

Figure 8:
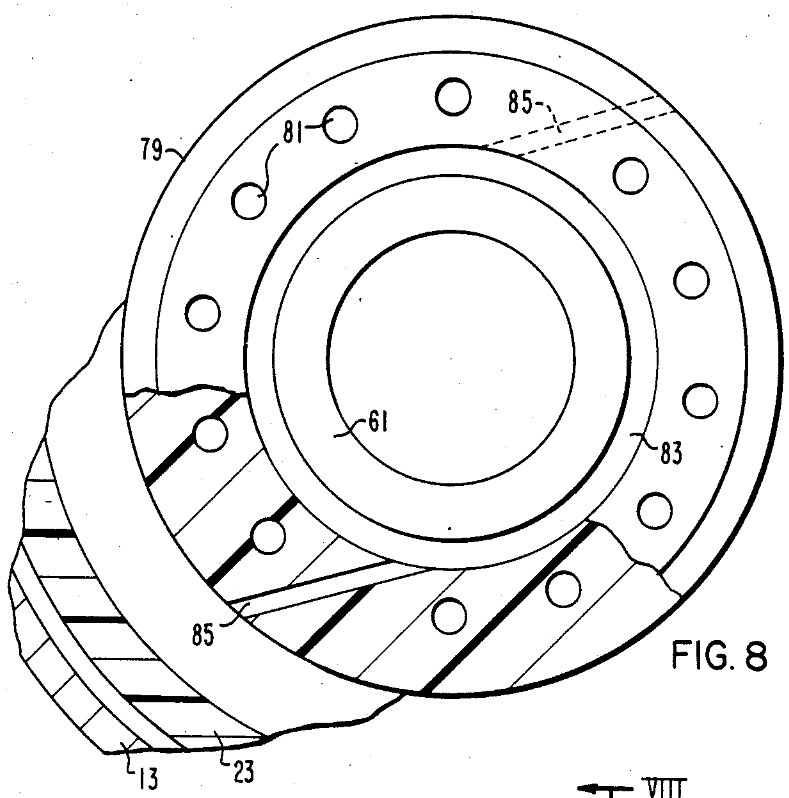
FIG. 8 is a vertical sectional view taken on the line VIII—VIII of FIG. 9.
Figure 9:
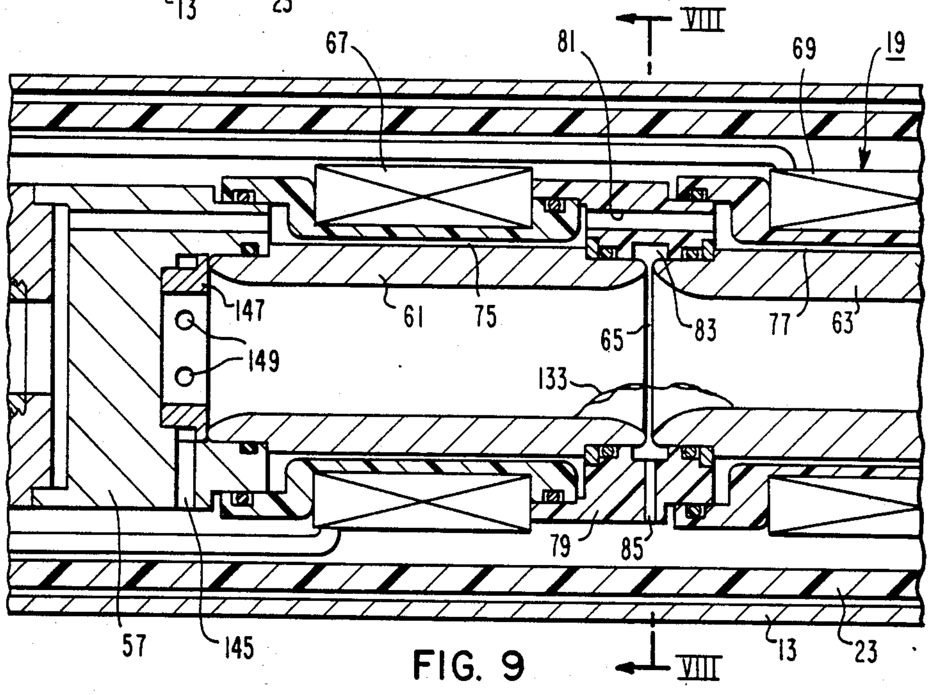
FIG. 9 is an enlarged sectional view of the gas manifold between the electrodes.

A major portion of the gas, however, is introduced through the arc gap 65 through the manifold 79 (FIGS. 8, 9). For that purpose the gas surrounding the arc heater unit 19 enters the several passages 85 (FIG. 9) into the groove 83 from where the gas flows at high pressure into the arc chamber through the annular arc gap 65, whereby the arc 133 is literally blown downstream toward the outlet end 17 of the arc chamber.

The arc heater plasma lance 11 is useful for a variety of applications. Examples of its use include the combustion of pluverized coal, waste disposal, melting metal such as metal chips, melting and vaporization of nonmetallics to make ultrafine particles, and ignition and flame stabilization. Procedures having some of these features have been patented in various configurations. One process is disclosed in U.S. Pat. No. 4,089,628, entitled "Pulverized Coal ARC Heated Igniter System" of which the inventor is P. R. Blackburn. Another process is described in U.S. Pat. No. 4,214,736, entitled "Arc Heater Melting System" of which the inventors include Charles B. Wolf et al. Another example of the use of an arc heater as a lance is shown in U.S. Pat. No. 4,247,732, entitled "Method and Apparatus for Electrically Firing an Iron Blast Furnace" of which the inventor is Maurice G. Fey.

Although the lance may be used manually for directing a flame at a specific one to be heated, the lance 11 may be also mounted in a fixed position. For that purpose a mounting ring 151 (FIG. 2) is mounted on the end of the end cap 89 in a suitable manner. The mounting ring 151 may be mounted in alignment with an opening 155 in a wall 157 of a furnace, wherein the outlet end 17 of the lance 11 is aligned with the opening. Suitable mounting means, such as a plurality of bolts 159, extend from the wall 157 and through the openings 153 for bolting the lance 11 in place.

In addition to its application for combustion processes, such as for boiler ignition, where an oxidizing gas (air or oxygen) is required, the torch or lance 11 can be employed for other purposes. The lance may also be used to provide heat to other processes requiring inert or reducing atmospheres by introducing suitable gases such as nitrogen, steam, synthesis gas, and natural gas. For example, nitrogen may be superheated and subsequently used to vaporize a metal to produce ultra fine metal particles. Or synthesis gases, containing large mole fractions of $CO_2$ and/or $H_2O$ may be superheated and subsequently reformed into CO and $H_2$ by admixtures of an appropriate hydrocarbon.

Inasmuch as the lance is exposed to deleterious conditions, such as high tempertures and polluted atmosphere, the exterior portions of the lance 11 including the tubular housing 13 and the end cap 89 may require replacement from time to time. For that purpose the outer housing, composed of a suitable material such as stainless steel, may be replaced. The housing is preferably comprised of two portions 13A and 13B. In this manner the downstream portion 13A is detachably mounted in a suitable manner, such as by a threaded joint 161 (FIG. 5) for connection to a mounting ring 163 secured to the right end of the upstream housing portion **13*b*. In addition the end cap 89 (FIG. 1B) is detachably mounted to the downstream end of the housing portion 13*a* in a suitable manner such as by a threaded joint 165. By this structure either or both of the housing portions 13A, 13B** and the end cap may be removed and replaced as required.

Accordingly, an arc heater plasma lance is provided, having the advantages of connection of all supplies, such as a coolant water, electric power, and a gas such as air connected at one end, the provision of a removable tip and end portion, a power level of up to three hundred kilowatts, an upstream swirl ring for cooling the upstream end of the arc chamber, provision of a water cooling system for the entire length of the outer housing shell, and elimination of a separate field coil power supplied by the provision of field coils connected in series with the arc heater electrodes.

Additional advantages include the lack of separate connections for water cooling coils which are cooled in parallel with electrode cooling means of internal connections, connections for water, electric and gas inlets are internal of the lance near the tip end, water return line and ground cable are externally connected at the tip end of the lance, internal high voltage parts are well insulated from the outer shell by dielectric tubular liner which also forms a return path for the cooling water, magnetic field coils of high voltage are insulated from low voltage parts such as the downstream electrode and end cap, and a swirl ring of dielectric material is provided for insulating the upstream and downstream electrodes.

What is claimed is:

1. An arc-heated plasma lance comprising:

an elongated tubular housing;

means including arcing surfaces defining an arc chamber within the housing and including a pair of axially spaced, substantially cylindrical electrodes forming a narrow gap therebetween and adapted to be connected to a source of electrical potential to produce an arc in the gap; said electrodes being electrically insulated from said housing the electrodes being disposed adjacent to one end of the housing and the arc chamber extending in opposite directions from the gap and having a downstream outlet port facing the one end of the housing;

means spacing and electrically insulating the electrodes from each other and comprising means for channeling gas to be heated at a high velocity through the gap and into the chamber;

each electrode having magnetic coil means for producing a magnetic field at the arcing surfaces of the electrodes to rotate the arc;

the arc heater being productive of an arc plasma heated gas ejected from the outlet port;

walls forming coolant means and conduits for circulating a coolant fluid to and from the electrodes and magnetic coil means;

supply means for supplying power, gas, and a coolant fluid to the corresponding electrodes, gap, coolant means, and conduits;

the supply means having terminal connectors disposed at the end of the housing opposite the outlet port;

the elongated tubular housing including a body portion and a detachable portion and the detachable portion enclosing the electrodes and magnetic coil means;

an electrically insulating sleeve extending substantially coextensively with the housing and forming with the housing a coolant-carrying clearance space adjacent to the housing, said coolant carrying clearance space being electrically insulated from the electrodes; and the sleeve extending between the housing and the electrodes.

2. The device of claim 1 in which the supply means include interfitting portions adapted for disassembly and reassembly when the body portion and detachable portions of the tubular housing are disassembled and reassembled.

3. The device of claim 1 in which the supply means for the gas comprise telescopically interfitting conduits.

4. The device of claim 1 in which the supply means for the coolant fluid comprises telescopically interfitting conduits.

5. The device of claim 2 in which the interfitting conduits are in a longitudinal zone substantially near the junction of the body portion and detachable portions of the housing.

6. The device of claim 1 in which the supply means for the coolant fluid comprises an inlet connection external of the housing.

7. The device of claim 1 in which the supply means for the gas comprises an inlet connection external of the housing.

8. The device of claim 1 in which supply means includes a gas selected from the group consisting of an oxidizing gas, air, and mixtures thereof.

9. The device of claim 1 in which the supply means includes a gas selected from the group consisting of an inert gas and a reducing gas.

10. The device of claim 9 in which the gas is selected from the group consisting of nitrogen, steam, synthesis gas and natural gas.

11. An arc-heated plasma lance comprising:

an elongated tubular housing;

means including arcing surfaces defining an arc chamber within the housing and including a pair of axially spaced, substantially cylindrical electrodes forming a narrow gap therebetween and adapted to be connected to a source of electrical potential to produce an arc in the gap, said electrodes being electrically insulated from said housing;

the electrodes being disposed adjacent to one end of the housing and the arc chamber and having a downstream outlet port facing the one end of the housing;

means spacing and electrically insulating the electrodes from each other and comprising means for channeling gas to be heated at a high velocity through the gap into the chamber and for ejecting heated plasma gas from the outlet port;

each electrode having magnetic coil means for producing a magnetic field at the arcing surfaces of the electrodes to rotate the arc;

walls forming coolant means and conduits for circulating a coolant fluid to and from the electrodes and magnetic coil means;

supply means for supplying power, gas, and a coolant fluid to the corresponding electrodes, gap, coolant means, and conduits;

the elongated tubular housing including a body portion and a detachable portion and the detachable portion enclosing the electrodes and magnetic coil means;

a dielectric sleeve extending substantially coextensively with the housing and forming with the housing a coolant-carrying clearance space adjacent to the housing, said coolant carrying clearance space being electrically insulated from the electrodes; and the sleeve extending between the housing and the electrodes.

12. The device of claim 11 in which the detachable portion of the housing encloses the electrodes and magnetic coil means.

13. An arc-heated plasma lance comprising:

an elongated tubular housing;

means including arcing surfaces defining an arc chamber within the housing and including a pair of axially spaced upstream and downstream electrodes forming a narrow gap therebetween and adapted to be connected to a source potential to produce an arc in the gap, said electrodes being electrically insulated from said housing;

the electrodes being disposed adjacent to one end of the housing and the arc chamber extending in opposite directions from the gap and having a downstream outlet port facing the one end of the housing;

means spacing and electrically insulating the electrodes from each other and comprising means for channeling gas to be heated at a high velocity through the gap and into the chamber;

each electrode having magnetic coil means for producing a magnetic field at the arcing surfaces of the electrodes to rotate the arc;

the arc heater being productive of an arc heated plasma gas ejected from the outlet port;

a dielectric sleeve extending substantially coextensively with the housing and forming with the housing a coolant-carrying clearance space adjacent to the housing, said coolant carrying clearance space being electrically insulated from the electrodes; and the sleeve extending between the housing and the electrodes.

* * * * *